United States Patent
Wilk et al.

[11] 3,809,520
[45] May 7, 1974

[54] FLUID HEATED SCOOP

[76] Inventors: Richard B. Wilk, 4384 Via Presada, Santa Barbara, Calif. 93105; Jack J. Hill, 1056 Latin Way, Los Angeles, Calif. 90065

[22] Filed: Feb. 22, 1972

[21] Appl. No.: 228,161

[52] U.S. Cl.................. 425/276, 30/140, 425/277
[51] Int. Cl. ............................................. A23g 5/02
[58] Field of Search ...... 425/276, 277; 30/141, 140; 128/400

[56] References Cited
UNITED STATES PATENTS

| | | |
|---|---|---|
| 2,166,810 | 7/1939 | Gammeter ......................... 425/277 |
| 3,425,419 | 2/1969 | Dato ................................... 128/400 |
| 2,053,357 | 9/1936 | Winder ............................. 128/400 X |
| 2,930,594 | 3/1960 | MacCracken................... 128/400 X |
| 2,560,900 | 7/1951 | Shultz ................................ 425/277 |
| 2,171,606 | 9/1939 | Shultz ................................ 425/277 |
| 2,255,052 | 9/1941 | Green .................................. 30/140 |

Primary Examiner—J. Spencer Overholser
Assistant Examiner—David S. Safran
Attorney, Agent, or Firm—William W. Haefliger

[57] ABSTRACT

An ice cream scoop bowl contains an interior fluid circulation passage having an inlet and outlet for fluid to circulate therethrough in heat transfer relation to the bowl. The interior passage configuration affords unusual advantages.

4 Claims, 5 Drawing Figures

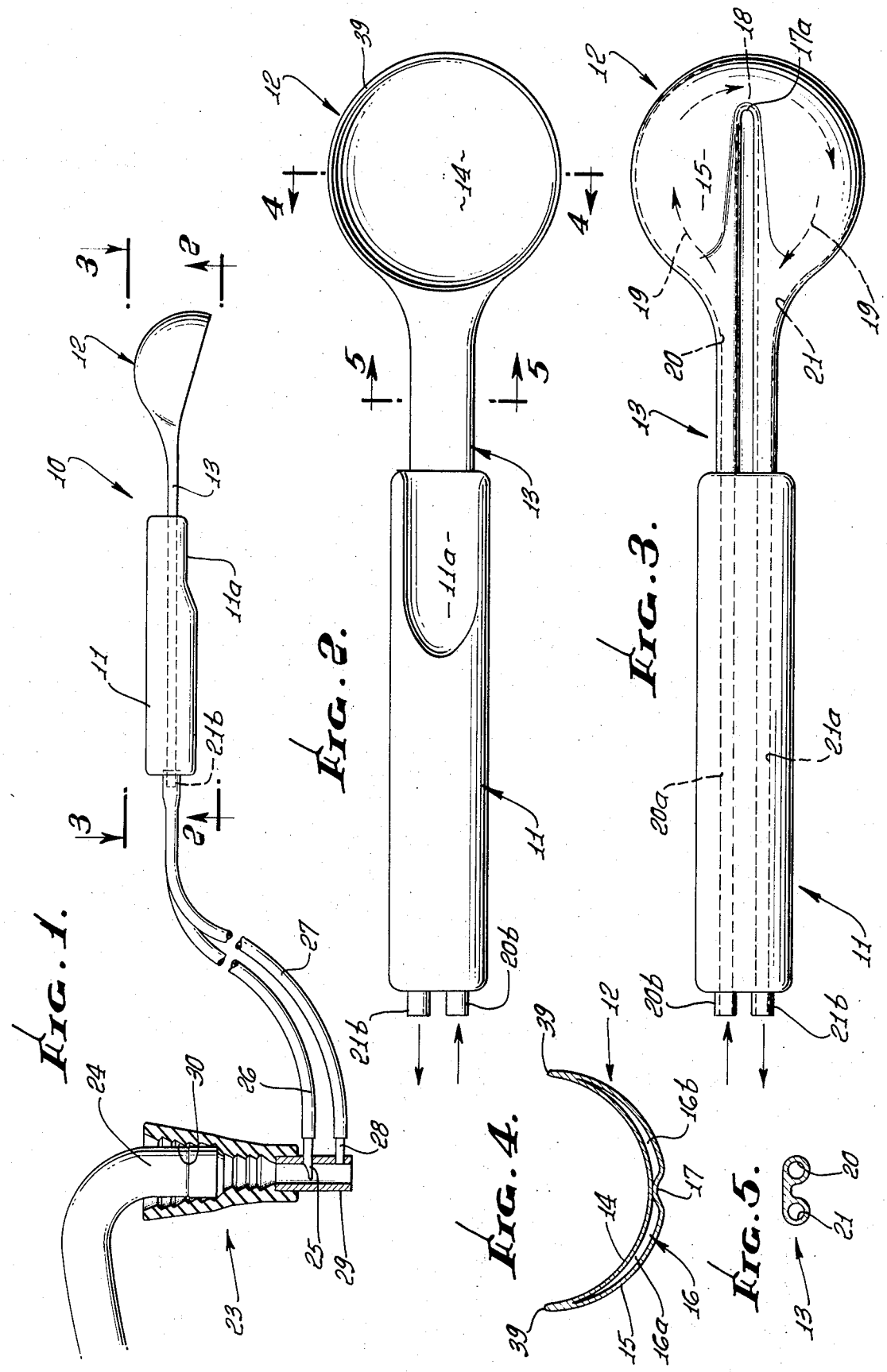

FLUID HEATED SCOOP

BACKGROUND OF THE INVENTION

This invention relates generally to devices for handling ice cream and the like, and more particularly concerns improvements in heating of ice cream scoops.

In the past, it has been common practice to place ice cream scoops or ladles in water wells or holders when not in use, so that the temperature of the scoop will be kept above that of the ice cream. This of course facilitates or eases the task of scooping ice cream particularly when the latter is frozen to a substantially hardened composition. Objections to the use of such wells include the ease and risk of contamination, the need for frequent changing of the water contents, and the constant need for return of the scoop to the well to raise the scoop temperature above that of the ice cream, introducing delays. In an effort to solve these problems, attempts have been made to provide electrically heated scoops; however, the latter raise problems of electrical shock, and are relatively complex and expensive to produce.

SUMMARY OF THE INVENTION

It is a major object of the invention to provide a heated ice cream scoop which obviates the problems associated with prior devices as described above. Basically, the scoop structure of the invention comprises a handle, a bowl connected with handle for scooping, and, the bowl containing an interior fluid circulation passage having an inlet and outlet for fluid to circulate in heat transfer relation with the bowl. As will appear, the latter may advantageously include a pair of thin concave members forming the circulation passage to extend throughout the major concave extents of those members, there being a baffle projecting to divide the passage into fluid inflow and outflow sections. The members may consist of metal such as stainless steel, and have edge interconnection to form a common rim.

A further object of the invention is to provide for attachment of the scoop to a water faucet. This is facilitated through attachment of a tubular header to the faucet tip, and the connection of inflow and discharge flexible tubes between the header and the scoop to communicate with the circulation passage as described.

These and other objects and advantages of the invention, as well as the details of an illustrative embodiment, will be more fully understood from the following description and drawings, in which:

DRAWING DESCRIPTION

FIG. 1 is an elevation showing the invention in its use environment;

FIG. 2 is an enlarged plan view taken on lines 2—2 of FIG. 1;

FIG. 3 is an enlarged plan view taken on lines 3—3 of FIGS. 1;

FIG. 4 is a section taken on line 4—4 of FIG. 2; and

FIG. 5 is a section taken on line 5—5 of FIG. 2.

DETAILED DESCRIPTION

The heated scoop 10 shown in the drawings includes a longitudinal handle 11, and a bowl 12 connected with the handle. Typically, the bowl is metallic, and the handle is carried on an elongated metallic bowl extension 13. The handle 11 may consist of heat insulative molded plastic material, and may be recessed at 11a, for reception of the user's thumb to prevent undesired turning of the implement during ice cream scooping.

In accordance with the invention, the bowl contains an interior fluid circulation passage having an inlet and outlet for fluid to circulate there through in heat transfer relation with the bowl, so as to melt adherent frozen substance such as ice cream as during scooping. In the example, the bowl 12 includes a pair of thin-walled concave members 14 and 15 forming the circulation passage 16 there between. The latter preferably extends between the members 14 and 15 throughout their major longitudinal and lateral concave extents, as is clear in FIG. 4. A longitudinal baffle 17 projects between the members to divide the passage 16 into inflow and outflow sections 16a and 16b, which merge at the region 18 beyond the baffle terminal 17a. Accordingly, complex coring of the bowl is not required. Broken line arrows 19 in FIG. 3 depict the flow path of liquid circulation in the bowl, the liquid (as for example water) preferably but not necessarily being heated. In the case of ice cream scooping, it is desirable that the liquid temperature be above that of the ice cream, so that a liquid film of the latter will quickly develop on the bowl surface to ease the task of scooping.

The thin bowl members 14 and 15 may desirably consist of stainless steel, and preferably have edge interconnection (as by brazing) to form a common rim 39 which is sharp enough for scooping purposes. Also, the longitudinal baffle 17 may be struck from or formed by the outer member 15, as seen in FIG. 4, to project into contact with the inner member, affording additional structural rigidity.

Further in accordance with another aspect of the invention, the passage 16 in the bowl has an inlet and an outlet, such as are indicated for example at 20 and 21 in the handle-shaped bowl extension 13. Also, fluid inlet and outlet passage extensions 20a and 21a may be formed in the handle 11 as for example in that part of bowl extension 13 on which handle 11 is carried. Extensions 20a and 21a have terminals (as at 20b and 21b) to which flexible tubing is attachable.

FIG. 1 shows the connection of the inlet and outlet passages, as described, and via flexible tubings, to a tubular header 23 attachable to a water faucet 24, to enable water circulation to the bowl interior and return to the header for downward discharge. For example, inlet water is conducted via tubular pick-up fitting 25 to tubing 26 connected to terminal 20b, and discharge water is returned via terminal 21b and flexible tubing 27 to the return fitting 28. Fittings 25 and 28 communicate with the interior of a header insert 29, as shown. Header 23 may consist of hard rubber, with a serrated interior 30 to closely fit and adhere to the faucet tip.

As is clear from the foregoing, the scoop construction is very simple, and permits of quick attachment to a water faucet for operation in a manner facilitating ease of scooping of ice cream. Also, the danger of electrical heating circuitry is eliminated, and the scoop need not be kept in a customary hot water well which can easily become contaminated.

We claim:

1. A heated ice cream scoop comprising
   a. a handle,
   b. a bowl connected with the handle, c. the bowl including a pair of concave members forming an interior fluid circulation passage to extend throughout the major concave extents of said members, and the passage having an inlet and outlet for fluid to circulate therethrough in heat transfer relation with the bowl, and d. there being a baffle projecting between said members to divide the passage into fluid inflow and outflow sections, the baffle being formed as an inwardly recessed wall portion of the bowl member having a generally convex outer survace, the baffle extending generally in the direction of the handle.

2. The heated scoop of claim 1 including flexible fluid inlet and outlet tubings communicating with said passage, a tubular header attachable to a faucet to pass faucet water, and the tubings attached to the header and communicating with the water passage interior thereof to receive and discharge water for circulation through the tubings and said passage.

3. The scoop of claim 1 wherein said members consist of stainless steel.

4. The scoop of claim 1 wherein the members have edge interconnection to form a common rim.

* * * * *